US012681165B2

(12) United States Patent
Inoue

(10) Patent No.: US 12,681,165 B2
(45) Date of Patent: Jul. 14, 2026

(54) TIME MEASUREMENT APPARATUS, COMPUTER-READABLE RECORDING MEDIUM STORING TIME MEASUREMENT PROGRAM, AND TIME MEASUREMENT SYSTEM

(71) Applicant: Fujitsu Limited, Kawasaki (JP)

(72) Inventor: Koki Inoue, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 18/636,416

(22) Filed: Apr. 16, 2024

(65) Prior Publication Data

US 2024/0393449 A1 Nov. 28, 2024

(30) Foreign Application Priority Data

May 24, 2023 (JP) ................................. 2023-085624

(51) Int. Cl.
*G01S 13/76* (2006.01)
(52) U.S. Cl.
CPC .................................. *G01S 13/765* (2013.01)
(58) Field of Classification Search
CPC .............................. G01S 13/765; G01S 5/14
See application file for complete search history.

(56) References Cited

U.S. PATENT DOCUMENTS

2005/0101331 A1 5/2005 Tamaki et al.
2009/0149198 A1 6/2009 Nam et al.

2020/0005566 A1* 1/2020 Jain .......................... G07C 9/28
2021/0072373 A1* 3/2021 Schoenberg .......... G01S 13/878
2022/0026517 A1 1/2022 Hasegawa et al.

(Continued)

FOREIGN PATENT DOCUMENTS

JP 2005-123833 5/2005
JP 2018-023018 2/2018
WO 2020/066103 4/2020

OTHER PUBLICATIONS

Choliz et al.,"Architectures for Location Data Acquisition and Distribution in UWB Indoor Tracking Systems", Positioning Navigation and Communication (WPNC), 2010 7th Workshop On, IEEE, Mar. 11, 2010, pp. 206-214, XP031815222. Cited in EESR dated Oct. 14, 2024 corresponding European Patent Application No. 24170707.4.

(Continued)

*Primary Examiner* — Nguyen T Vo
(74) *Attorney, Agent, or Firm* — Fujitsu Intellectual Property Center

(57) ABSTRACT

A time measurement apparatus includes: a memory and a processor coupled to the memory and configured to: select, from among a plurality of anchors for each of which an own installation position is registered, a predetermined anchor for which an installation position that geographically corresponds to a declaration position declared by a terminal is registered; and specify, as round-trip communication delay time between the terminal and the predetermined anchor, time measured based on a reception time point of a first packet received by the predetermined anchor from the terminal and a reception time point of a second packet based on a response packet that responds to the first packet and is received by the predetermined anchor from the terminal.

9 Claims, 15 Drawing Sheets

RECEIVE MEASUREMENT PACKET (FIRST TIME)
TRANSMIT RESPONSE PACKET (FIRST TIME)

RECEIVE MEASUREMENT PACKET (SECOND TIME)
TRANSMIT RESPONSE PACKET (SECOND TIME)

$t^{A_1}_{from=T}[1]$    $\Delta^{A_1}_{from=T}$    $t^{A_1}_{from=T}[2]$

21 — ANCHOR (ID:A1) →TIME POINT $t^{A_1}$

ROUND-TRIP    ROUND-TRIP $\Delta^T$

10 — TARGET (ID:T) → TIME POINT $t^T$ $t^T_{to=A_1}[1]$    $t^T_{to=A_1}[2]$

TRANSMIT MEASUREMENT PACKET (FIRST TIME)

RECEIVE RESPONSE PACKET (FIRST TIME)
TRANSMIT MEASUREMENT PACKET (SECOND TIME)

(56) References Cited

U.S. PATENT DOCUMENTS

| 2022/0065979 A1 | 3/2022 | Bao et al. |
| 2022/0146620 A1 | 5/2022 | Alawieh et al. |

OTHER PUBLICATIONS

Weinberg et al., "How to Catch when Proxies Lie", Oct. 31, 2018, pp. 203-217, XP058419087. Cited in EESR dated Oct. 14, 2024 corresponding European Patent Application No. 24170707.4.

EESR—Extended European Search Report dated Oct. 14, 2024 from corresponding European Patent Application No. 24170707.4 [8 pages].

Du Ben, et al. "RIPE IPmap active geolocation: Mechanism and performance evaluation." ACM SIGCOMM Computer Communication Review 50.2 (2020): 3-10.

* cited by examiner

FIG. 5

TBL

| No. | FIRST RECEPTION TIME POINT | SECOND RECEPTION TIME POINT | DIFFERENCE TIME | VERIFICATION RESULT |
|-----|----------------------------|-----------------------------|-----------------|---------------------|
| 1 | 5:00:00.000 | 5:00:00.031 | 31ms | ○ |
| 2 | 6:12:33.001 | 6:12:33.016 | 15ms | × |

| No. | FIRST RECEPTION TIME POINT | SECOND RECEPTION TIME POINT | DIFFERENCE TIME | VERIFICATION RESULT |
|-----|----------------------------|-----------------------------|-----------------|---------------------|
| 1 | 5:00:00.000 | 5:00:00.031 | 31ms | ○ |
| 2 | 6:12:33.001 | 6:12:33.016 | 15ms | × |

| No. | FIRST RECEPTION TIME POINT | SECOND RECEPTION TIME POINT | DIFFERENCE TIME | VERIFICATION RESULT |
|-----|----------------------------|-----------------------------|-----------------|---------------------|
| 1 | 5:00:00.000 | 5:00:00.031 | 31ms | ○ |
| 2 | 6:12:33.001 | 6:12:33.016 | 15ms | × |
| 3 | $t^{A_1}_{from=T}[1]$ | $t^{A_1}_{from=T}[2]$ | $\Delta^{A_1}_{from=T}$ | |

FIG. 12

TIME MEASUREMENT APPARATUS, COMPUTER-READABLE RECORDING MEDIUM STORING TIME MEASUREMENT PROGRAM, AND TIME MEASUREMENT SYSTEM

CROSS-REFERENCE TO RELATED APPLICATION

This application is based upon and claims the benefit of priority of the prior Japanese Patent Application No. 2023-85624, filed on May 24, 2023, the entire contents of which are incorporated herein by reference.

FIELD

The embodiments discussed herein are related to a time measurement apparatus, a time measurement program, and a time measurement system.

BACKGROUND

RIPE Atlas is known, which is a project started by Reseaux IP Europeans Network Coordination Centre (RIPE NCC). In RIPE Atlas, probes serving as fixed-point observation nodes are installed in universities and research institutions around the world, and Internet measurement is achieved. RIPE NCC checks Internet communication around the world based on data observed by the probes.

Japanese Laid-open Patent Publication No. 2018-023018, Japanese Laid-open Patent Publication No. 2005-123833, International Publication Pamphlet No. WO 2020/066103, U.S. Patent Application Publication No. 2022/0146620, and U.S. Patent Application Publication No. 2009/0149198 are disclosed as related art.

Ben Du et al., "RIPE IPmap Active Geolocation: Mechanism and Performance Evaluation", *ACM SIGCOMM Computer Communication Review*, Vol. 50, Issue 2, pp. 3-10, April 2020 is disclosed as related art.

SUMMARY

According to an aspect of the embodiments, a time measurement apparatus includes: a memory and a processor coupled to the memory and configured to: select, from among a plurality of anchors for each of which an own installation position is registered, a predetermined anchor for which an installation position that geographically corresponds to a declaration position declared by a terminal is registered; and specify, as round-trip communication delay time between the terminal and the predetermined anchor, time measured based on a reception time point of a first packet received by the predetermined anchor from the terminal and a reception time point of a second packet based on a response packet that responds to the first packet and is received by the predetermined anchor from the terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an example of a difference time table;

FIG. 12 is an example of a processing sequence diagram according to a third embodiment;

DESCRIPTION OF EMBODIMENTS

A probe may transmit a packet to a terminal of a user. For example, the probe transmits, as a measurement packet, an echo request of Internet control message protocol (ICMP) by using a ping command. When the terminal receives the packet transmitted from the probe, the terminal returns an echo reply to the probe as a response packet. A controller coupled to the probe may measure round-trip communication delay time (round-trip-time: RTT) based on a transmission time point of the packet and a reception time point of the response packet. Round-trip communication delay time is time indicating the length of delay of reception of a response packet after a probe has transmitted a packet. For example, when propagation speed of a packet and round-trip communication delay time are used, the controller may narrow down an approximate position of the terminal. There are various types of techniques for measuring the position of a terminal.

Incidentally, there is a case in which some terminals are set to refuse return of a response packet for a packet transmitted by a probe. There is also a case in which a packet transmitted by a probe is discarded by a gateway disposed over a communication network. In such cases, the probe may not receive a response packet, and measurement of round-trip communication delay time by the controller is difficult.

Accordingly, in one aspect, it is an object to provide a time measurement apparatus, a time measurement program, and a time measurement system that suppress measurement difficulty of round-trip communication delay time.

Hereinafter, embodiments of the present disclosure will be described with reference to the drawings.

First Embodiment

Figure 1:
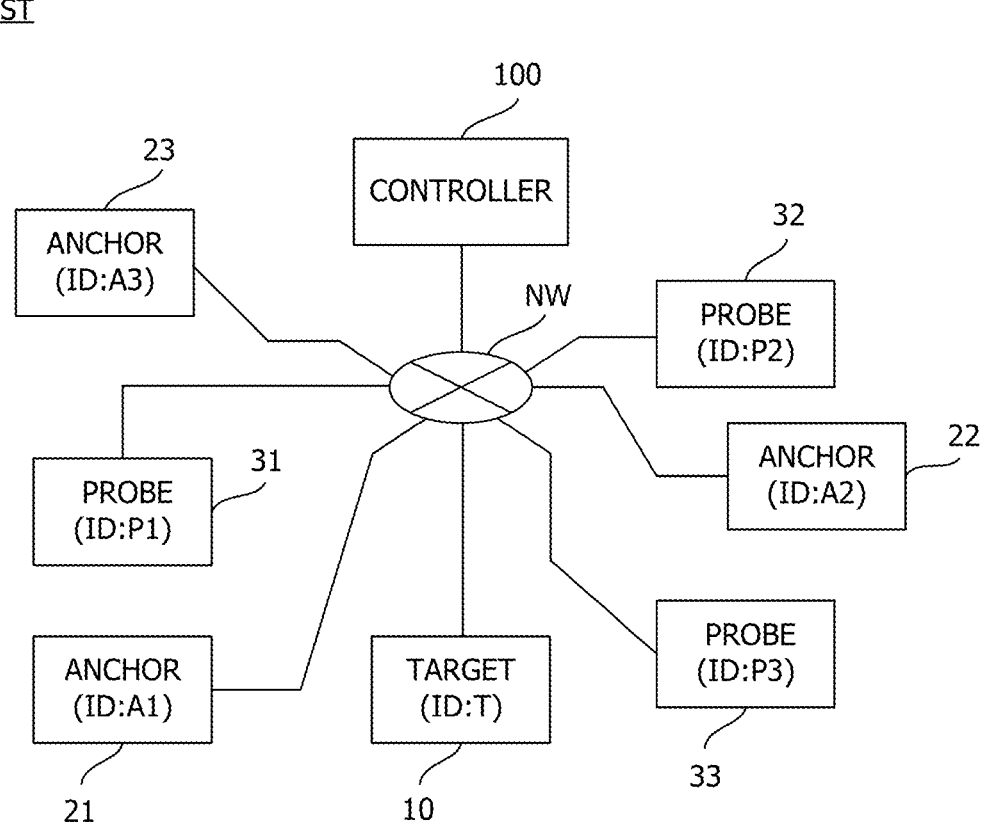
FIG. 1 is an example of a time measurement system.

As illustrated in FIG. 1, a time measurement system ST includes a target 10, a plurality of anchors 21, 22, and 23, a plurality of probes 31, 32, and 33, and a controller 100. The target 10 is an example of a terminal. The controller 100 is an example of a time measurement apparatus. For example, the controller 100 may be realized by a management server that manages the time measurement system ST. For example, the target 10 may be realized by a mobile terminal such as a smartphone or a tablet terminal. The target 10 may also be realized by a fixed terminal including a smart television or the like coupled to the Internet. The identification information (denoted as ID) "T" is registered for the target 10.

The target 10, the anchors 21, 22, and 23, the probes 31, 32, and 33, and the controller 100 are coupled to each other via a communication network NW. For example, the communication network NW includes the Internet, a local area network (LAN), a wide area network (WAN), and the like. The communication network NW includes any one or both of wired coupling and wireless coupling.

The anchors 21, 22, and 23 and the probes 31, 32, and 33 are computers or internet of things (IoT) devices disposed at various locations of which positions are different from each other, such as universities, research institutions, and companies around the world. Each of the anchors 21, 22, and 23 and the probes 31, 32, and 33 is registered with its own installation position as position information together with identification information. For example, the identification information "A1" is registered for the anchor 21. The identification information "P1" is registered for the probe 31.

The probe 31 may transmit a packet to be used for measurement of round-trip communication delay time (hereinafter referred to as a measurement packet) to the target 10, the anchors 21, 22, and 23, and the probes 32 and 33. The probe 31 may receive a response packet responding to the measurement packet transmitted by the probe 31 itself from the target 10, the anchors 21, 22, and 23, and the probes 32 and 33.

On the other hand, the probe 31 may not receive packets other than the response packet responding to the measurement packet transmitted by the probe 31 itself. For this reason, the probe 31 may not receive a measurement packet transmitted by the target 10, the anchors 21, 22, and 23, and the probes 32 and 33. Since the probes 32 and 33 are basically similar to the probe 31, detailed description thereof will be omitted.

The anchor 21 may transmit a measurement packet to the target 10, the anchors 22 and 23, and the probes 31, 32, and 33. The anchor 21 may receive a response packet responding to the measurement packet transmitted by the anchor 21 itself from the target 10, the anchors 22 and 23, and the probes 31, 32, and 33.

Unlike the probe 31, the anchor 21 may also receive packets other than the response packet responding to the measurement packet transmitted by the anchor 21 itself. For this reason, the anchor 21 may receive a measurement packet transmitted by the target 10, the anchors 22 and 23, and the probes 31, 32, and 33. As described above, the anchor 21 is different from the probe 31 in that the anchor 21 may receive a measurement packet. Since the anchors 22 and 23 are basically similar to the anchor 21, detailed description thereof will be omitted.

The target 10 transmits a measurement packet to any of the anchors 21, 22, and 23 when the target 10 proves the position of the target 10 itself. For example, there is a case in which a service provider of a communication service is a business operator that distributes videos, and this business operator limits the distribution area of videos to Japan. In such a case, some users may deceive the service provider for a malicious purpose that the position of the target 10 is located in Japan even though the target 10 is located outside Japan. For example, Global Positioning System (GPS) spoofing, hiding of IP address by a proxy, fraudulent modification of the target 10, and the like are used for the malicious purpose.

In order to avoid that a user obtains a dishonest profit by such a fraudulent act and avoid a disadvantage of the service provider, the service provider confirms the true position of the target 10 in advance. When confirmation of the true position of the target 10 is requested from the service provider, the target 10 proves the position of the target 10 itself by using the time measurement system ST. For example, when verification of a declaration position declared by the target 10 is requested, the controller 100 of the time measurement system ST requests the target 10 to transmit a measurement packet. Accordingly, the target 10 transmits a measurement packet to any of the anchors 21, 22, and 23.

Although details will be described later, the controller 100 acquires, from the anchor 21, difference time measured based on a reception time point of a first measurement packet received by the anchor 21 from the target 10 and a reception time point of a second measurement packet that is based on a response packet responding to the first measurement packet. When the difference time is acquired, the controller 100 specifies the acquired difference time as the round-trip communication delay time between the target 10 and the anchor 21. As described above, measurement of round-trip communication delay time, which is difficult with the probe 31, may be achieved by using the anchor 21.

The controller 100 may verify the appropriateness or validity of the position of the target 10 by verifying the round-trip communication delay time between the probes 31, 32, and 33 and the anchor 21 and the round-trip communication delay time between the target 10 and the anchor 21.

Figure 2A:
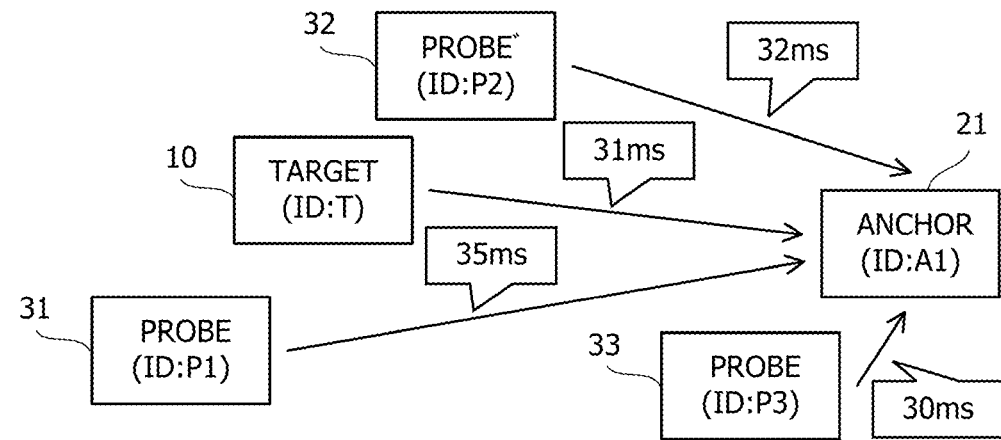
FIG. 2A is a diagram for describing an example of a valid declaration.

For example, as illustrated in FIG. 2A, the controller 100 specifies the round-trip communication delay time between the target 10 and the anchor 21 as 31 milliseconds (ms). The controller 100 specifies the round-trip communication delay time between the probe 31 and the anchor 21 as 35 ms. The controller 100 specifies the round-trip communication delay time between the probe 32 and the anchor 21 as 32 ms. The controller 100 specifies the round-trip communication delay time between the probe 33 and the anchor 21 as 30 ms. When the controller 100 verifies the round-trip communication delay time specified in this manner, it may be determined that the target 10 is geographically located in the vicinity of the probes 31, 32, and 33. Therefore, if a declaration position of the target 10 is in the vicinity of the probes 31, 32, and 33, the controller 100 may determine that the declaration position of the target 10 is appropriate (or valid). It is estimated that, as the round-trip communication delay time is longer, the distance between two points (for example, the target 10 and the anchor 21) tends to be longer.

Figure 2B:
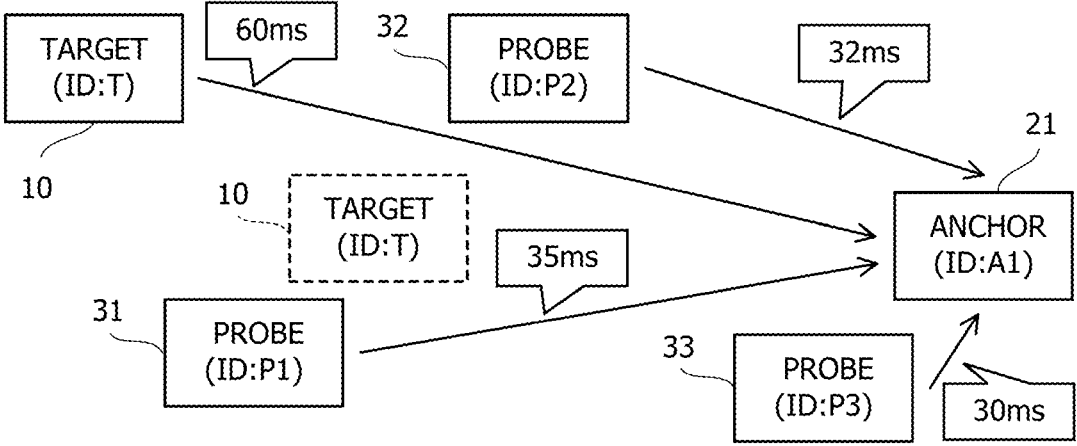
FIG. 2B is a diagram for describing an example of a false declaration.

On the other hand, as illustrated in FIG. 2B, the controller 100 specifies the round-trip communication delay time between the target 10 and the anchor 21 as 60 ms. The controller 100 specifies the round-trip communication delay time between the probes 31, 32, and 33 and the anchor 21 as 35 ms, 32 ms, and 30 ms, respectively. When the controller 100 verifies such round-trip communication delay time, it may be determined that the target 10 is not located in the vicinity of the probes 31, 32, and 33 and is located at a place far away from the anchor 21. Therefore, if a declaration position of the target 10 is in the vicinity of the probes 31, 32, and 33, the controller 100 may determine that the declaration position of the target 10 is fraudulent (or inappropriate) and is falsified.

Figure 2C:
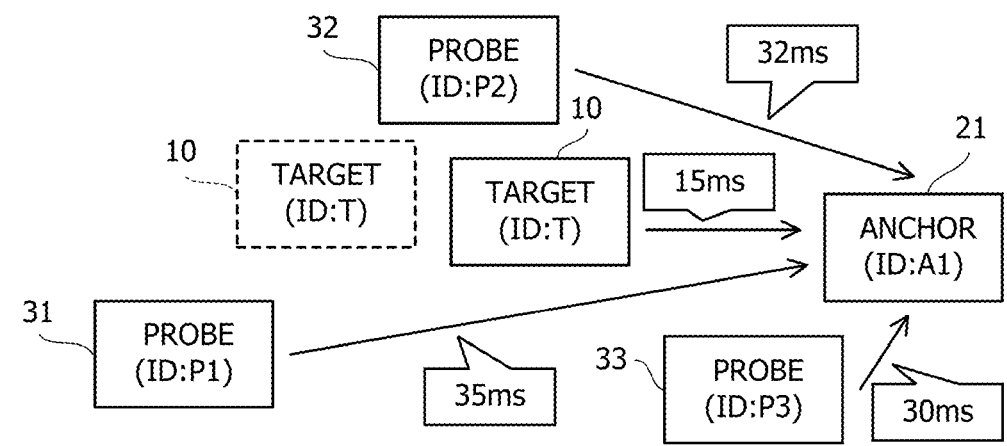
FIG. 2C is a diagram for describing another example of a false declaration.

As illustrated in FIG. 2C, the controller 100 specifies the round-trip communication delay time between the target 10 and the anchor 21 as 15 ms. The controller 100 specifies the round-trip communication delay time between the probes 31, 32, and 33 and the anchor 21 as 35 ms, 32 ms, and 30 ms, respectively. When the controller 100 verifies such round-trip communication delay time, it may be determined that the target 10 is not located in the vicinity of the probes 31, 32, and 33 and is located closer to the anchor 21 than to the positions of the probes 31, 32, and 33. Therefore, if a declaration position of the target 10 is in the vicinity of the probes 31, 32, and 33, the controller 100 may determine that the declaration position of the target 10 is fraudulent (or inappropriate) and is falsified.

Figure 3:
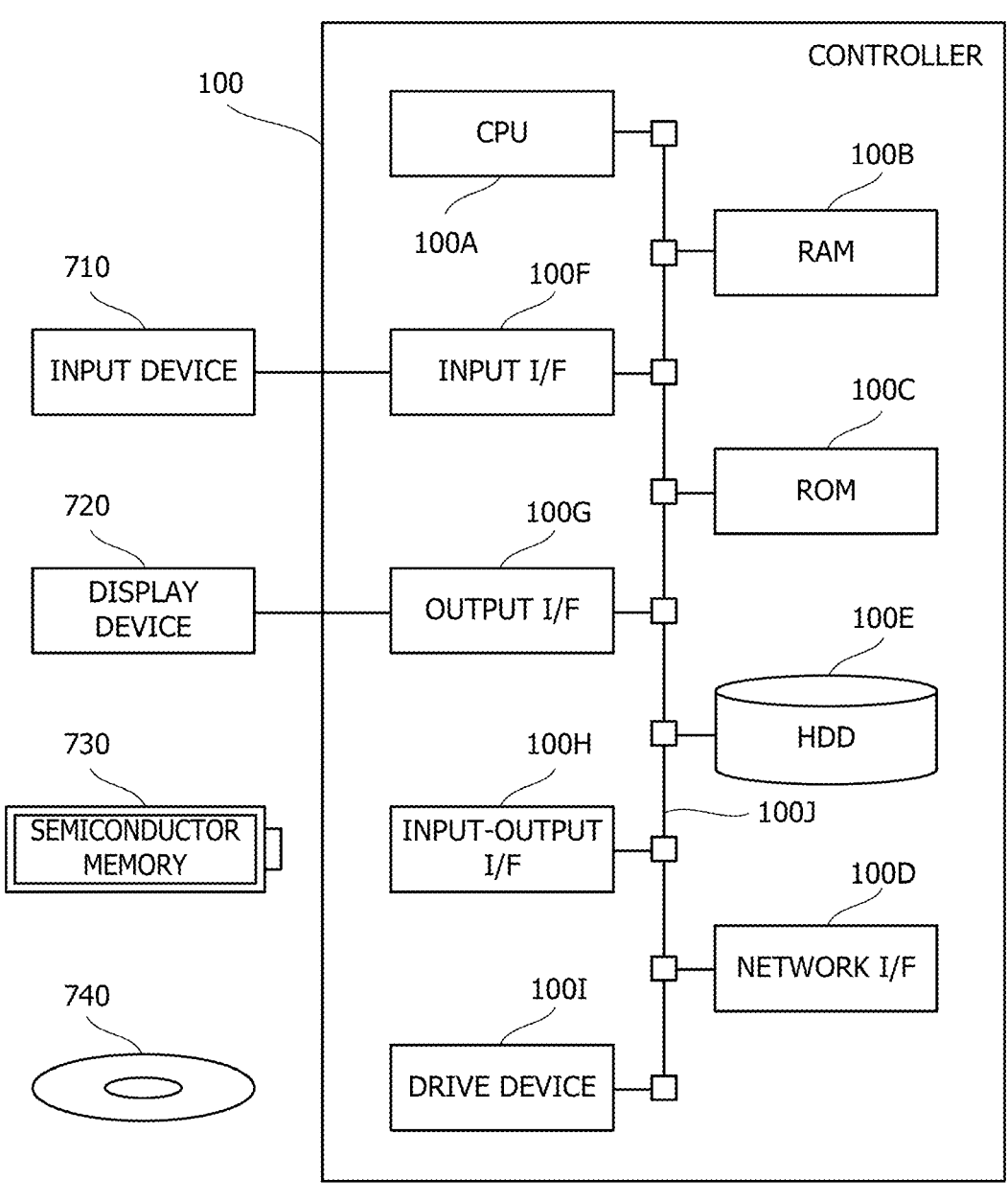
FIG. 3 is an example of a hardware configuration of a controller.

Next, a hardware configuration of the controller 100 will be described with reference to FIG. 3. Since hardware configurations of the target 10, the anchors 21, 22, and 23, and the probes 31, 32, and 33 are basically similar to the hardware configuration of the controller 100, detailed description thereof will be omitted.

The controller 100 includes a central processing unit (CPU) 100A as a processor, and a random-access memory (RAM) 100B and a read-only memory (ROM) 100C as memories. The controller 100 includes a network interface (I/F) 100D and a hard disk drive (HDD) 100E. A solid-state drive (SSD) may be adopted instead of the HDD 100E.

The controller 100 may include at least one of an input I/F 100F, an output I/F 100G, an input-output I/F 100H, and a drive device 100I as appropriate. The CPU 100A to the drive device 100I are coupled to one another via an internal bus 100J. For example, the controller 100 may be realized by a computer.

An input device 710 is coupled to the input I/F 100F. Examples of the input device 710 include a keyboard, a mouse, a touch panel, and the like. A display device 720 is coupled to the output I/F 100G. Examples of the display device 720 include a liquid crystal display and the like. A semiconductor memory 730 is coupled to the input-output I/F 100H. Examples of the semiconductor memory 730 include a Universal Serial Bus (USB) memory, a flash memory, and the like. The input-output I/F 100H reads a time measurement program stored in the semiconductor memory 730. For example, the input I/F 100F and the input-output I/F 100H include a USB port. For example, the output I/F 100G includes a display port.

A portable-type recording medium 740 is inserted into the drive device 100I. Examples of the portable-type recording medium 740 include a removable disc such as a compact disc (CD)-ROM or a Digital Versatile Disc (DVD). The drive device 100I reads a time measurement program recorded in the portable-type recording medium 740. For example, the network I/F 100D includes a LAN port, a communication circuit, and the like. The communication circuit includes any one or both of a wired communication circuit and a wireless communication circuit. The network I/F 100D is coupled to the communication network NW.

A time measurement program stored in at least one of the ROM 100C, the HDD 100E, and the semiconductor memory 730 is temporarily stored in the RAM 100B by the CPU 100A. A time measurement program recorded in the portable-type recording medium 740 is temporarily stored in the RAM 100B by the CPU 100A. By the CPU 100A executing a stored time measurement program, the CPU 100A realizes various types of functions to be described later, and executes a time measurement method including various types of processing to be described later. A time measurement program may be a program corresponding to a processing sequence diagram to be described later.

Figure 4:
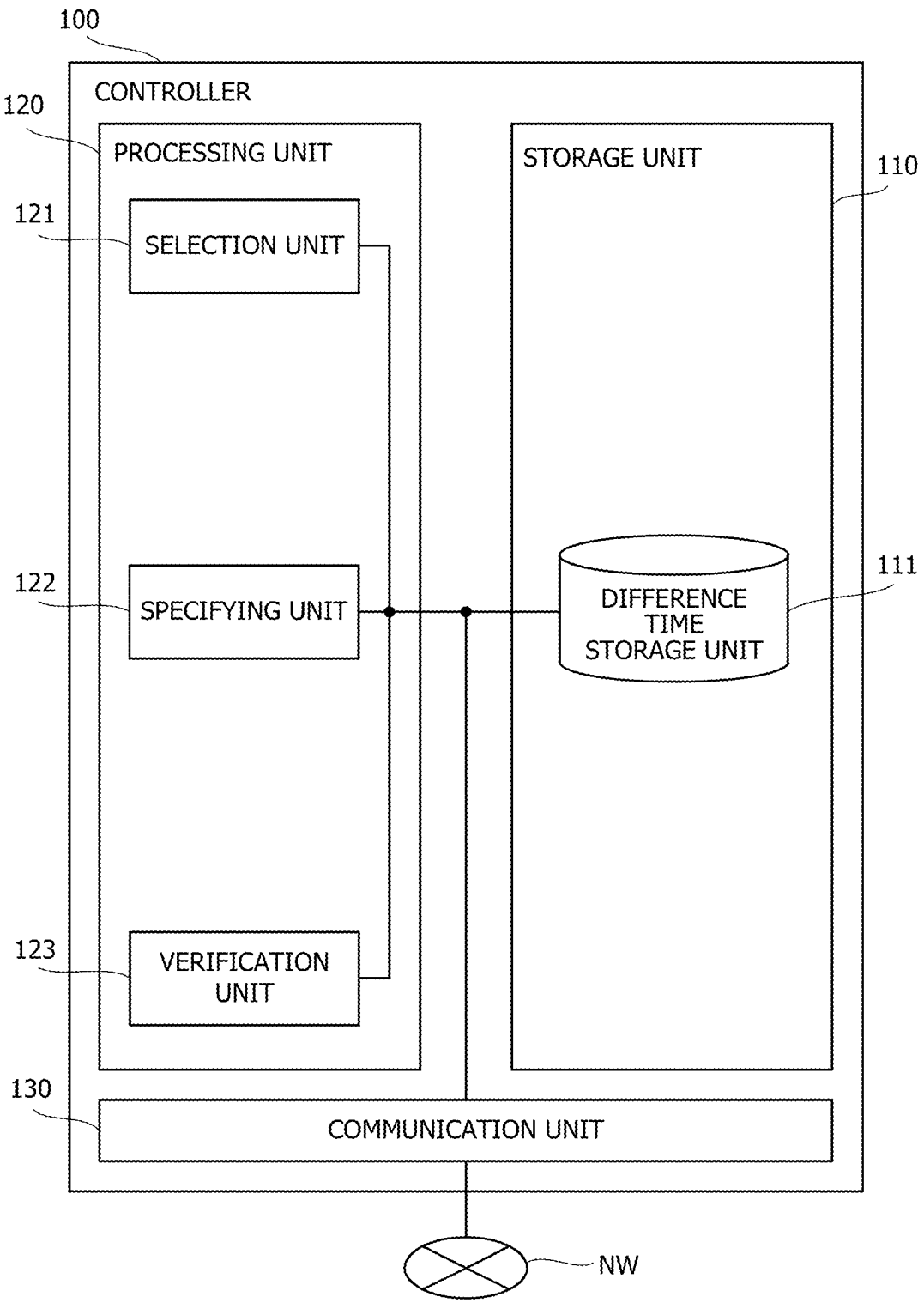
FIG. 4 is an example of a functional configuration of the controller.

A functional configuration of the controller 100 will be described with reference to FIGS. 4 and 5. FIG. 4 illustrates the main parts of the functions of the controller 100.

As illustrated in FIG. 4, the controller 100 includes a storage unit 110, a processing unit 120, and a communication unit 130. The storage unit 110 may be realized by any one or both of the RAM 100B and the HDD 100E described above. The processing unit 120 may be realized by the CPU 100A described above. The communication unit 130 may be realized by the network I/F 100D described above.

The storage unit 110, the processing unit 120, and the communication unit 130 are coupled to one another. The storage unit 110 includes a difference time storage unit 111. The processing unit 120 includes a selection unit 121, a specifying unit 122, and a verification unit 123.

For example, the difference time storage unit 111 stores difference time information including information such as difference time measured based on reception time points of measurement packets received by the anchor 21 from the target 10. For example, as illustrated in FIG. 5, the difference time storage unit 111 manages difference time information by a difference time table TBL. Difference time information includes a plurality of items such as management number (denoted as No. in FIG. 5), first reception time point, second reception time point, difference time, and verification result.

A management number for managing difference time information is registered for the item of management number. A reception time point of a first measurement packet received by the anchor 21 from the target 10 is registered for the item of first reception time point. A reception time point of a second measurement packet received by the anchor 21 from the target 10 is registered for the item of second reception time point. A time point difference between a reception time point of a first measurement packet and a reception time point of a second measurement packet is registered as difference time for the item of difference time. A verification result of a declaration position of the target 10 is registered for the item of verification result.

For example, when a declaration position of the target 10 is appropriate, the verification result "○" is registered for the item of verification result. Conversely, when a declaration position of the target 10 is inappropriate, the verification result "x" is registered for the item of verification result. A reception time point of a first measurement packet received by the anchor 21 from the probe 31 may be registered for the item of first reception time point. A reception time point of a second measurement packet received by the anchor 21 from the probe 31 may be registered for the item of second reception time point.

The selection unit 121 selects, as a predetermined anchor, any one of the anchors 21, 22, and 23 for which an installation position geographically corresponding to a declaration position declared by the target 10 is registered, from among the plurality of anchors 21, 22, and 23 for each of which an own installation position is registered. For example, in a case where the target 10 is geographically close to the anchor 21 as compared with the anchors 22 and 23, the selection unit 121 selects the anchor 21 as the predetermined anchor. As in the selection of a predetermined anchor, the selection unit 121 may also select, as a predetermined probe, any one of the probes 31, 32, and 33 for which an installation position geographically corresponding to a declaration position declared by the target 10 is registered, from among the plurality of probes 31, 32, and 33 for each of which an own installation position is registered.

The specifying unit 122 specifies the time measured by a predetermined anchor based on a reception time point of a first measurement packet and a reception time point of a second measurement packet, as the round-trip communication delay time between the target 10 and the predetermined anchor. For example, in a case where the selection unit 121 selects the anchor 21 as the predetermined anchor, the specifying unit 122 specifies the difference time measured by the anchor 21 based on two reception time points as the round-trip communication delay time between the target 10 and the anchor 21. When the round-trip communication delay time is specified, the specifying unit 122 registers the reception time point of the first measurement packet, the reception time point of the second measurement packet, and the round-trip communication delay time for the items of first reception time point, second reception time point, and difference time, respectively.

The verification unit 123 verifies the appropriateness of a declaration position of the target 10 based on a collation result of password information attached to a response packet and password information attached to a second measurement packet and the round-trip communication delay time specified by the specifying unit 122. Password information attached to a response packet is generated by the anchor 21 selected by the selection unit 121 using a random number. For example, a one time password that is valid only once is adopted as password information.

When the same password information as the password information attached to the response packet is not attached to the second measurement packet, the collation result is a disagreement. For example, if the target 10 transmits a second measurement packet to the anchor 21 before a response packet transmitted from the anchor 21 is received, there is a high possibility that password information different from the password information attached to the response packet is attached to the second measurement packet. In such a case, since the collation result of the pieces of password information is a disagreement, the verification unit 123 registers the verification result "x" for the item of verification result. When the collation result of the pieces of password information is an agreement, the verification unit 123 may register the verification result "○" for the item of verification result.

Figure 7:
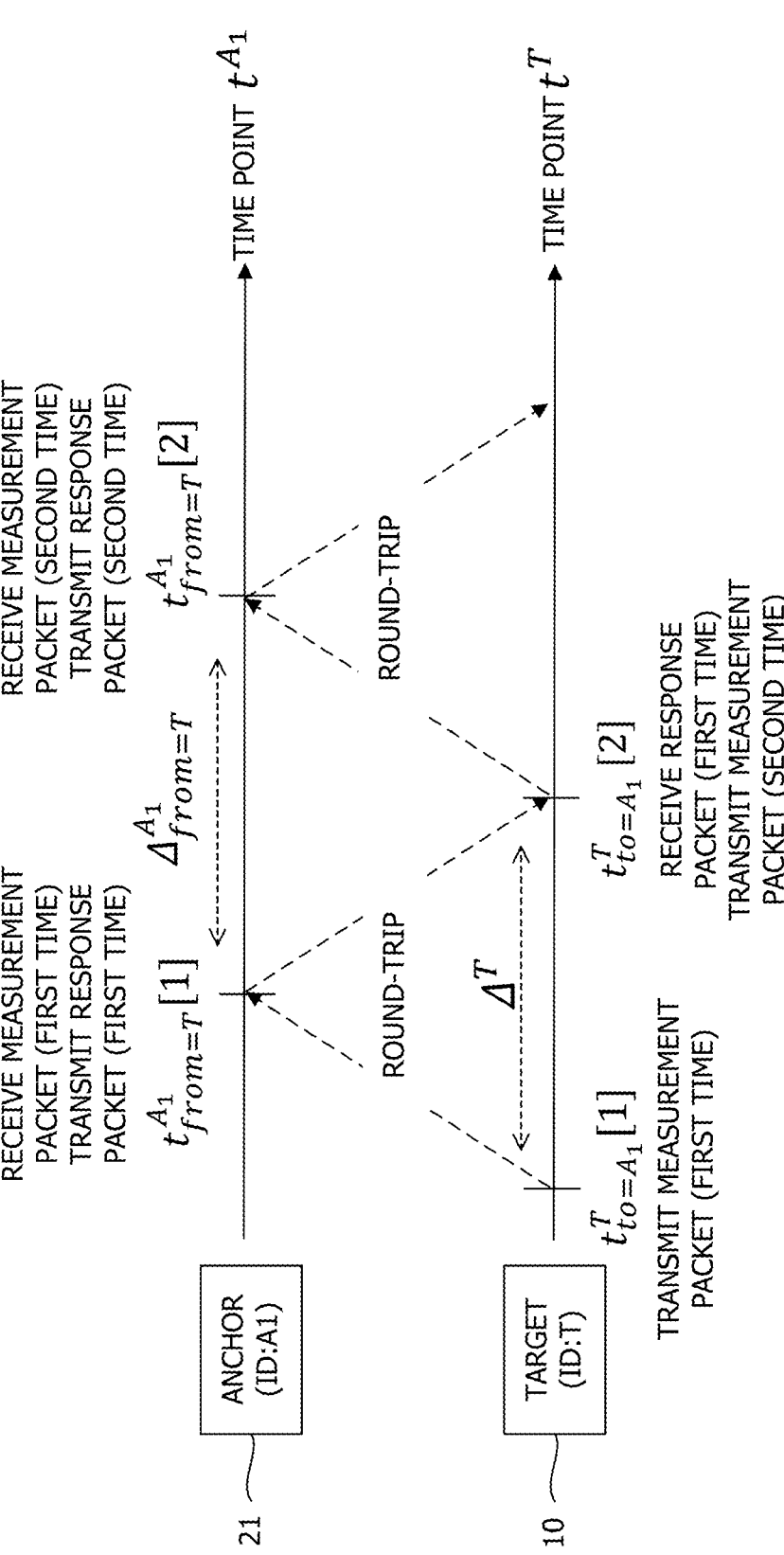
FIG. 7 is a diagram for describing an example of specifying round-trip communication delay time.
Figure 8:
FIG. 8 is a transition example of a difference time table.

The operation of the time measurement system ST will be described with reference to FIGS. 6 to 8.

Figure 6:
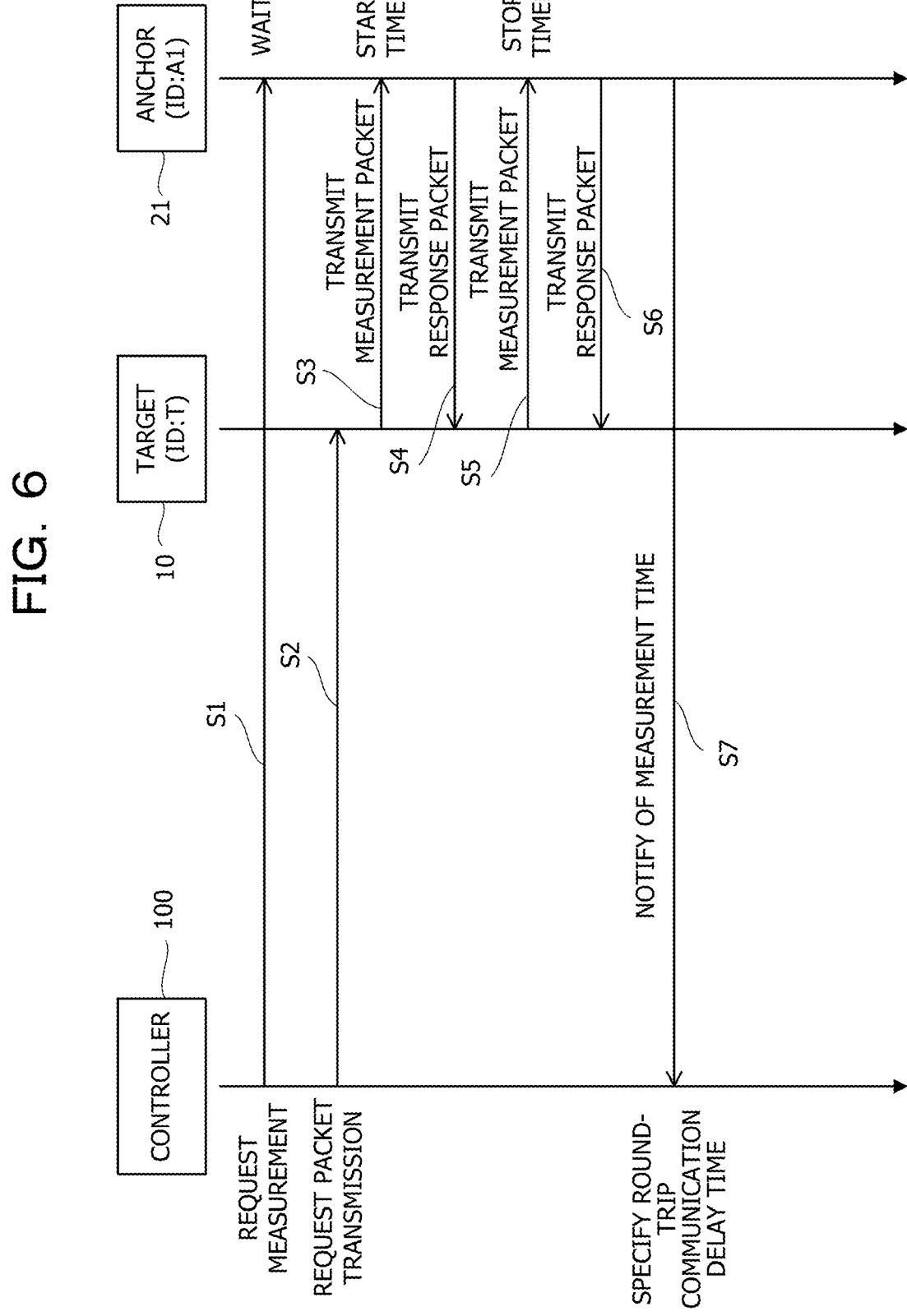
FIG. 6 is an example of a processing sequence diagram according to a first embodiment.

First, as illustrated in FIG. 6, the selection unit 121 of controller 100 requests the anchor 21 to measure difference time of reception time points (step S1). For example, the selection unit 121 selects the anchor 21 geographically corresponding to a declaration position of the target 10 from among the anchors 21, 22, and 23, and requests the selected anchor 21 to measure difference time of reception time points. Accordingly, the anchor 21 waits for reception of a measurement packet transmitted from the target 10.

Next, the specifying unit 122 of the controller 100 requests the target 10 to transmit a packet (step S2). When transmission of a packet is requested by the controller 100, the target 10 transmits a first measurement packet to the anchor 21 (step S3). The first measurement packet transmitted by the target 10 is an example of a first packet. For example, as illustrated in FIG. 7, when the target 10 is requested to transmit a packet, the target 10 transmits the first measurement packet. Accordingly, the anchor 21 receives the first measurement packet at a first reception time point, which is a time point reached after a first predetermined time has elapsed from a transmission time point of the target 10. For example, calculation of the first predetermined time may be performed based on a physical distance between the target 10 and the anchor 21 and a propagation speed of a packet. As illustrated in FIG. 6, when the first measurement packet is received, the anchor 21 starts a timer.

When the timer is started, the anchor 21 transmits a first response packet responding to the first measurement packet to the target 10 (step S4). For example, as illustrated in FIG. 7, the anchor 21 immediately transmits the first response packet to the target 10 at or immediately after the first reception time point. Accordingly, the target 10 receives the first response packet after a second predetermined time has elapsed from a transmission time point of the anchor 21. Assuming that the physical distance between the target 10 and the anchor 21 and the propagation speed of a packet are the same, the second predetermined time is the same as the first predetermined time described above. By the target 10 receiving the first response packet, round-trip communication delay time $\Delta^T$ from the transmission time point of the first measurement packet to a reception time point of the first response packet is specified.

When the first response packet is transmitted from the anchor 21, as illustrated in FIG. 6, the target 10 transmits a second measurement packet to the anchor 21 (step S5). The second measurement packet transmitted by the target 10 is an example of a second packet. For example, as illustrated in FIG. 7, when the first response packet is received, the target 10 immediately transmits the second measurement packet at or immediately after the reception time point of the first response packet. Accordingly, the anchor 21 receives the second measurement packet at a second reception time point, which is a time point reached after a third predetermined time has elapsed from a transmission time point of the target 10. Assuming that the physical distance between the target 10 and the anchor 21 and the propagation speed of a packet are the same, the third predetermined time is the same as the first predetermined time described above.

When the second measurement packet is transmitted from the target 10, as illustrated in FIG. 6, the anchor 21 stops the timer and transmits a second response packet responding to the second measurement packet to the target 10 (step S6). For example, as illustrated in FIG. 7, the second response packet is immediately transmitted to the target 10 at or immediately after the second reception time point. Accordingly, the target 10 receives the second response packet after a fourth predetermined time has elapsed from a transmission time point of the anchor 21. Assuming that the physical distance between the target 10 and the anchor 21 and the propagation speed of a packet are the same, the fourth predetermined time is the same as the first predetermined time described above.

When the second response packet is transmitted, as illustrated in FIG. 6, the anchor 21 notifies the controller 100 of the measurement time (step S7). For example, by stopping the timer, the anchor 21 notifies of the measurement time from the start of the timer to the stop of the timer. As illustrated in FIG. 7, the measurement time corresponds to the difference time from the first reception time point of the first measurement packet received by the anchor 21 to the second reception time point of the second measurement packet. The difference time is the same as the round-trip communication delay time $\Delta^T$ from the transmission time point of the first measurement packet to the reception time point of the first response packet. For example, the anchor 21 notifies the controller 100 of the difference time corresponding to the round-trip communication delay time $\Delta^T$ from the transmission time point of the first measurement packet to the reception time point of the first response packet as the measurement time, together with the first reception time point and the second reception time point.

When the measurement time is notified of from the anchor 21 together with the first reception time point and the second reception time point, as illustrated in FIG. 6, the specifying unit 122 of the controller 100 specifies the measurement time as round-trip communication delay time. Along with the specifying of round-trip communication delay time, as illustrated in FIG. 8, the specifying unit 122 registers the measurement time, the first reception time point, and the second reception time point in the difference time table TBL. As described above, measurement of round-trip communication delay time, which is difficult with the probe 31, may be achieved by using the anchor 21.

The difference between measurement of round-trip communication delay time based on the probes 31, 32, and 33 and measurement of round-trip communication delay time based on the anchors 21, 22, and 23 will be described with reference to FIGS. 9A and 9B.

Figure 9A:
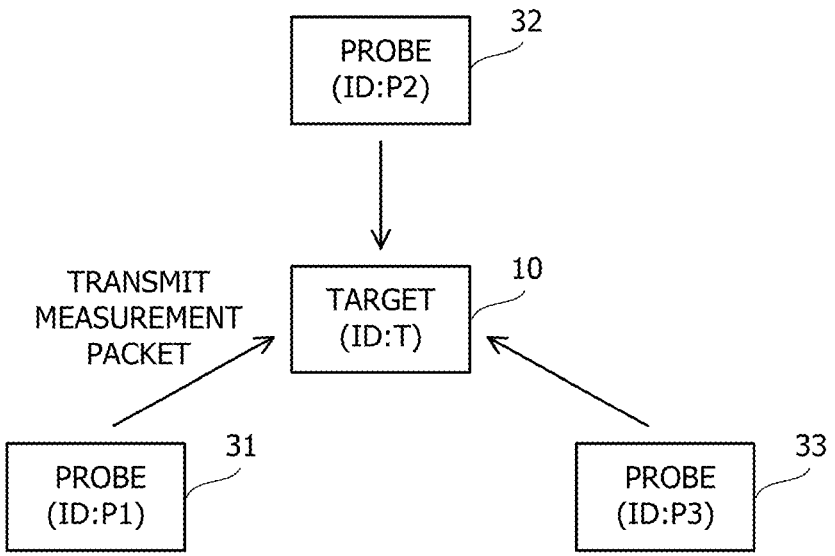
FIG. 9A is an example of measurement of round-trip communication delay time based on a probe and FIG. 9B is an example of measurement of round-trip communication delay time based on an anchor.

First, as illustrated in FIG. 9A, for example, round-trip communication delay time may be measured by the probe 31 transmitting a measurement packet to the target 10. However, there is a case in which the target 10 is set to refuse return of a response packet for a measurement packet. There is also a case in which a measurement packet transmitted by the probe 31 is discarded by a gateway (not illustrated) disposed over the communication network NW. In such cases, the probe 31 may not receive a response packet from the target 10, and measurement of round-trip communication delay time is difficult.

Figure 9B:
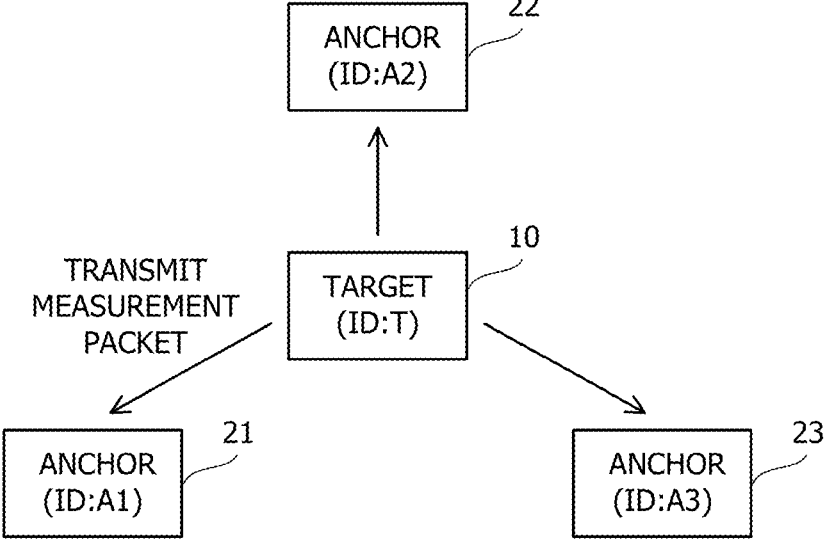

On the other hand, as illustrated in FIG. 9B, for example, in a case where round-trip communication delay time is measured by the target 10 transmitting a measurement packet to the anchor 21, the anchor 21 may receive a measurement packet regardless of the setting of the target 10. The anchor 21 may measure difference time of reception time points of a first measurement packet transmitted from the target 10 and a second measurement packet transmitted from the target 10 based on a response packet responding to the first measurement packet. By the difference time, round-trip communication delay time between the target 10 and the anchor 21 may be measured.

Second Embodiment

A second embodiment of the present disclosure will be described with reference to FIGS. 10 and 11. A controller 100 according to the second embodiment may detect fraud by the target 10 using a collation result based on password information.

Figure 10:
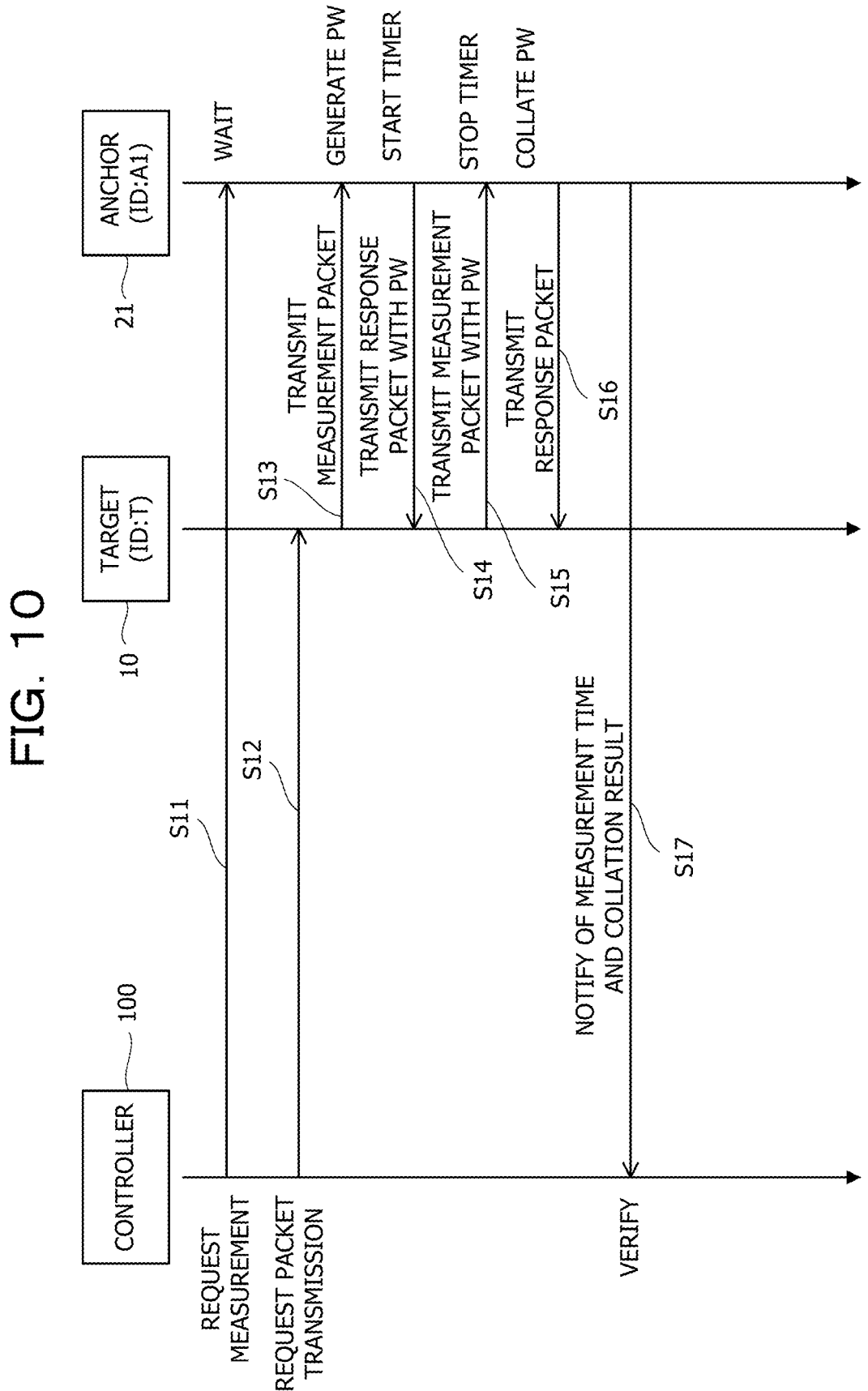
FIG. 10 is an example of a processing sequence diagram according to a second embodiment.
Figure 11:
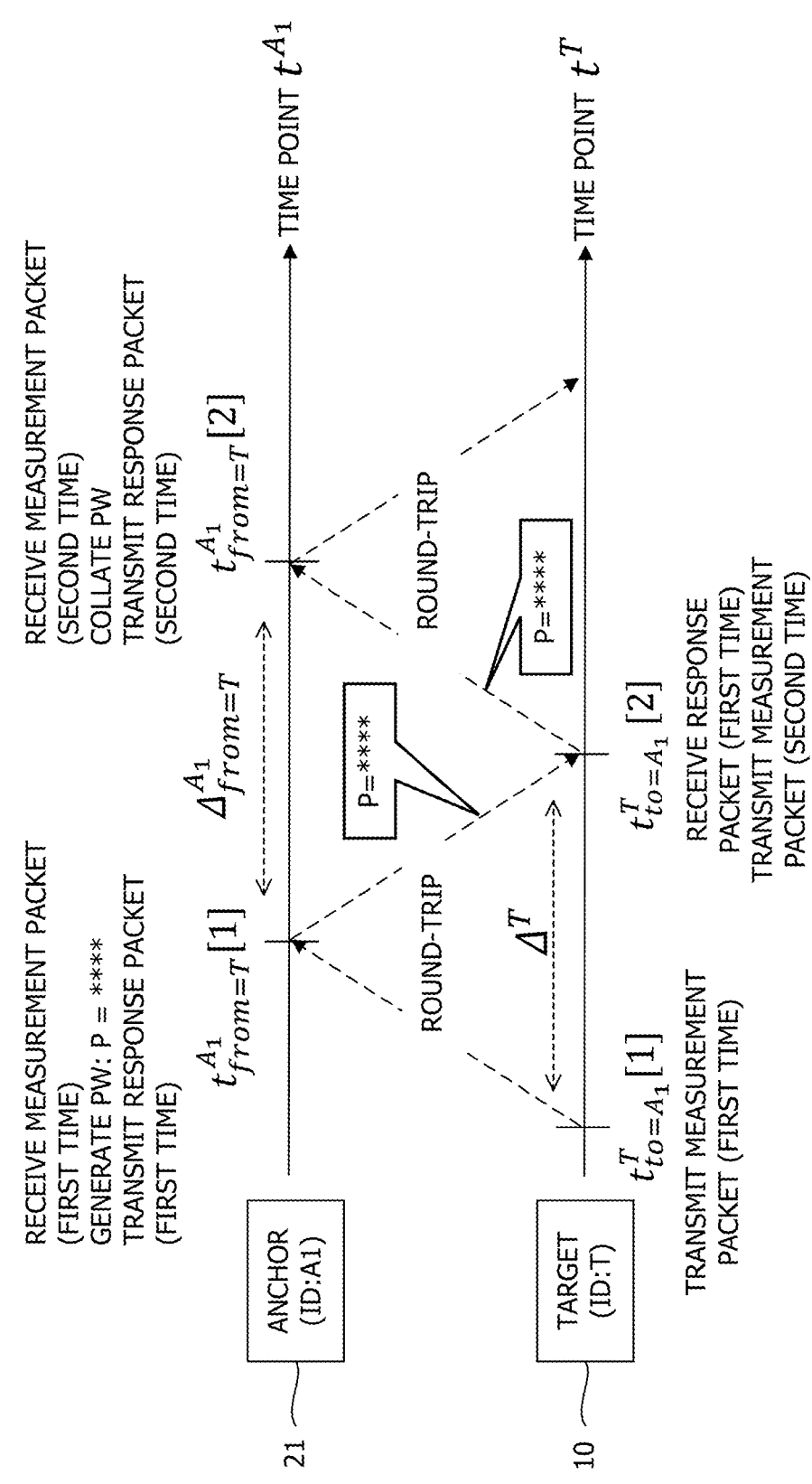
FIG. 11 is a diagram for describing an example of fraud detection using password information.

First, as illustrated in FIG. 10, the selection unit 121 of the controller 100 requests the anchor 21 to measure difference time of reception time points (step S11). Accordingly, the anchor 21 waits for reception of a measurement packet transmitted from the target 10.

Next, the specifying unit 122 of the controller 100 requests the target 10 to transmit a packet (step S12). When transmission of a packet is requested by the controller 100, the target 10 transmits a first measurement packet to the anchor 21 (step S13). For example, as illustrated in FIG. 11, when the target 10 is requested to transmit a packet, the target 10 transmits the first measurement packet. Accordingly, the anchor 21 receives the first measurement packet at a first reception time point, which is a time point reached after a first predetermined time has elapsed from a transmission time point of the target 10. As illustrated in FIGS. 10 and 11, when the first measurement packet is received, the anchor 21 generates password information (denoted as PW) using a random number and starts a timer.

When the timer is started, as illustrated in FIG. 10, the anchor 21 transmits a first response packet with password information responding to the first measurement packet to the target 10 (step S14). For example, as illustrated in FIG. 11, the anchor 21 attaches the password information to the first response packet, and immediately transmits the first response packet with password information to the target 10 at or immediately after the first reception time point. Accordingly, the target 10 receives the first response packet with password information after a second predetermined time has elapsed from a transmission time point of the anchor 21. By the target 10 receiving the first response packet with password information, round-trip communication delay time $\Delta^T$ from the transmission time point of the first measurement packet to a reception time point of the first response packet with password information is specified.

When the first response packet with password information is transmitted from the anchor 21, as illustrated in FIG. 10, the target 10 transmits a second measurement packet attached with password information to the anchor 21 (step S15). For example, as illustrated in FIG. 11, when the first response packet with password information is received, the target 10 acquires the password information and attaches the password information to the second measurement packet. The target 10 immediately transmits the second measurement packet attached with password information at or immediately after the reception time point of the first response packet with password information. Accordingly, the anchor 21 receives the second measurement packet attached with password information at a second reception time point, which is a time point reached after a third predetermined time has elapsed from a transmission time point of the target 10.

When the second measurement packet attached with password information is transmitted from the target 10, as illustrated in FIG. 10, the anchor 21 stops the timer and collates the pieces of password information. The anchor 21 transmits a second response packet responding to the second measurement packet attached with password information to the target 10 (step S16). For example, as illustrated in FIG. 11, the second response packet is immediately transmitted to the target 10 at or immediately after the second reception time point. Accordingly, the target 10 receives the second response packet after a fourth predetermined time has elapsed from a transmission time point of the anchor 21.

When the second response packet is transmitted, as illustrated in FIG. 10, the anchor 21 notifies the controller 100 of the measurement time and collation result (step S17). For example, by stopping the timer, the anchor 21 notifies the measurement time from the start of the timer to the stop of the timer together with the collation result. As illustrated in FIG. 11, the measurement time corresponds to the difference time from the first reception time point of the first measurement packet to the second reception time point of the second measurement packet. The difference time is the same as the round-trip communication delay time $\Delta^T$ from the transmission time point of the first measurement packet to the reception time point of the first response packet. For example, the anchor 21 notifies the controller 100 of the difference time corresponding to the round-trip communication delay time $\Delta^T$ from the transmission time point of the first measurement packet to the reception time point of the first response packet as the measurement time, together with the collation result, the first reception time point, and the second reception time point.

With regard to the collation result, if the same password information as the password information generated by the anchor 21 is attached to the second measurement packet, the anchor 21 notifies of a collation result indicating that the pieces of password information agree. On the other hand, if password information different from the password information generated by the anchor 21 is attached to the second measurement packet, the anchor 21 notifies of a collation result indicating that the pieces of password information disagree. For example, in a case where the target 10 intentionally generates arbitrary password information before a response packet with password information is received and transmits a second measurement packet attached with the arbitrary password information, the anchor 21 notifies of a collation result indicating that the pieces of password information disagree. For example, since the pieces of password information disagree, the anchor 21 may detect that the target 10 has fraudulently advanced the round-trip communication delay time.

When the measurement time and collation result are notified of from the anchor 21 together with the first reception time point and the second reception time point, the specifying unit 122 of the controller 100 specifies the measurement time as round-trip communication delay time. Along with the specifying of round-trip communication delay time, the specifying unit 122 registers the measurement time, the first reception time point, and the second reception time point in the difference time table TBL (see also FIG. 8). The verification unit 123 verifies the collation result, and registers the verification result for the item of verification result (see also FIG. 8). For example, when the collation result indicating that the pieces of password information agree is notified of, the verification unit 123 registers the verification result "○". Conversely, when the collation result indicating that the pieces of password information disagree is notified of, the verification unit 123 registers the verification result "x". As described above, the controller 100 according to the second embodiment may detect fraud in round-trip communication delay time by the target 10 using password information.

Third Embodiment

A third embodiment of the present disclosure will be described with reference to FIGS. 12 and 13. A controller 100 according to the third embodiment may verify the appropriateness of a declaration position of the target 10 by using the anchor 21 and the probe 31.

Figure 12:
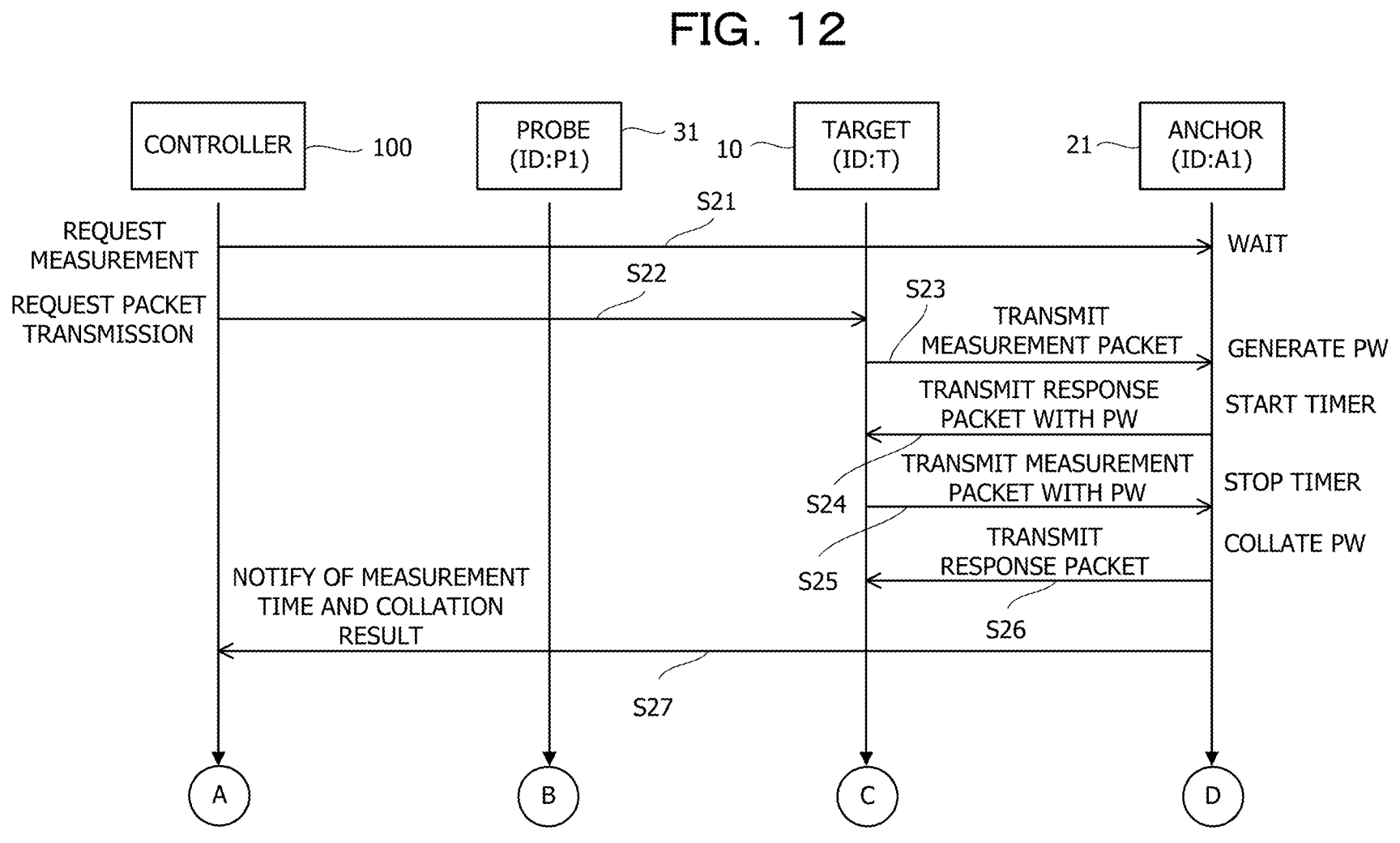

First, as illustrated in FIG. 12, the selection unit 121 of the controller 100 requests the anchor 21 to measure difference time of reception time points (step S21). Accordingly, the anchor 21 waits for reception of a measurement packet transmitted from the target 10.

Next, the specifying unit 122 of the controller 100 requests the target 10 to transmit a packet (step S22). When transmission of a packet is requested by the controller 100, the target 10 transmits a first measurement packet to the anchor 21 (step S23). When the first measurement packet is received, the anchor 21 generates password information using a random number and starts a timer.

When the timer is started, the anchor 21 transmits a first response packet with password information responding to the first measurement packet to the target 10 (step S24). When the first response packet with password information is transmitted from the anchor 21, the target 10 transmits a second measurement packet attached with password information to the anchor 21 (step S25). When the second measurement packet attached with password information is transmitted from the target 10, the anchor 21 stops the timer, collates the pieces of password information, and transmits a second response packet responding to the second measurement packet attached with password information to the target 10 (step S26).

When the second response packet is transmitted, the anchor 21 notifies the controller 100 of the measurement time and collation result (step S27). For example, by stopping the timer, the anchor 21 notifies of the measurement time from the start of the timer to the stop of the timer together with the collation result. If the same password information as the password information generated by the anchor 21 is attached to the second measurement packet, the anchor 21 notifies of a collation result indicating that the pieces of password information agree. If password information different from the password information generated by the anchor 21 is attached to the second measurement packet, the anchor 21 notifies of a collation result indicating that the pieces of password information disagree.

Figure 13:
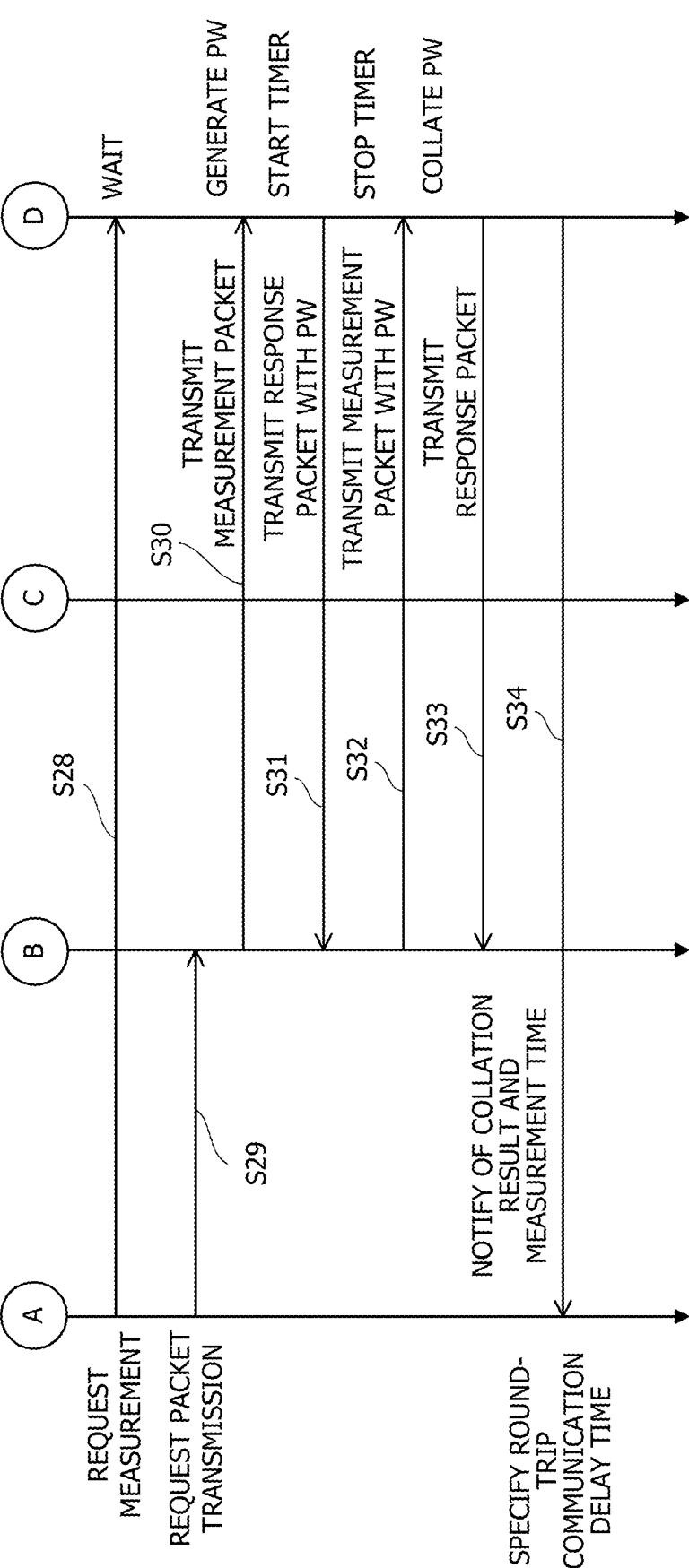
FIG. 13 is another example of the processing sequence diagram according to the third embodiment.

When the measurement time and collation result are notified of from the anchor 21, as illustrated in FIG. 13, the selection unit 121 of the controller 100 requests the anchor 21 to measure difference time of reception time points (step S28). Accordingly, the anchor 21 waits for reception of a measurement packet transmitted from any of the probes 31, 32, and 33.

Next, the selection unit 121 of the controller 100 selects the probe 31 closest to the declaration position of the target 10 from among the probes 31, 32, and 33, and the specifying unit 122 requests the probe 31 selected by the selection unit 121 to transmit a packet (step S29). When transmission of a packet is requested by the controller 100, the probe 31 transmits a first measurement packet to the anchor 21 (step S30). The first measurement packet transmitted by the probe 31 is an example of a third packet. When the first measurement packet transmitted from the probe 31 is received, the anchor 21 generates password information using a random number and starts a timer.

When the timer is started, the anchor 21 transmits a first response packet with password information responding to the first measurement packet to the probe 31 (step S31). When the first response packet with password information is transmitted from the anchor 21, the probe 31 transmits a second measurement packet attached with password information to the anchor 21 (step S32). The second measurement packet transmitted by the probe 31 is an example of a fourth packet. When the second measurement packet attached with password information is transmitted from the probe 31, the anchor 21 stops the timer, collates the pieces of password information, and transmits a second response packet responding to the second measurement packet attached with password information to the probe 31 (step S33).

When the second response packet is transmitted, the anchor 21 notifies the controller 100 of the measurement time and collation result (step S34). For example, by stopping the timer, the anchor 21 notifies of the measurement time, which is a time difference from the start of the timer to the stop of the timer, together with the collation result. If the same password information as the password information generated by the anchor 21 is attached to the second measurement packet, the anchor 21 notifies of a collation result indicating that the pieces of password information agree. If password information different from the password information generated by the anchor 21 is attached to the second measurement packet, the anchor 21 notifies of a collation result indicating that the pieces of password information disagree.

When the measurement time and collation result are notified of from the anchor 21, the specifying unit 122 of the controller 100 specifies the measurement time as round-trip communication delay time. For example, the specifying unit 122 specifies the measurement time notified of in the processing of step S27 as first round-trip communication delay time between the target 10 and the anchor 21. The specifying unit 122 specifies the measurement time notified of in the processing of step S34 as second round-trip communication delay time between the probe 31 and the anchor 21.

In a case where both of the two collation results notified of in the processing of steps S27 and S34 indicate that the pieces of password information agree, the verification unit 123 verifies the appropriateness of the declaration position of the target 10 based on a result of comparison between the first round-trip communication delay time and the second round-trip communication delay time. For example, when the absolute value of the difference between the first round-trip communication delay time and the second round-trip communication delay time is equal to or smaller than threshold time θ (for example, 10 ms), the verification unit 123 may determine that the declaration position of the target 10 and the position where the probe 31 is installed are very close to each other (see also FIG. 2A). For this reason, since the declaration position of the target 10 is appropriate, the verification unit 123 registers the verification result "○".

On the other hand, when the absolute value of the difference between the first round-trip communication delay time and the second round-trip communication delay time is larger than the threshold time θ, the verification unit 123 may determine that the declaration position of the target 10 and the position where the probe 31 is installed are far from each other (see also FIG. 2B). For this reason, since the declaration position of the target 10 may be determined to be fraudulent, the verification unit 123 registers the verification result "x". As described above, the controller 100 according to the third embodiment may detect fraud in round-trip communication delay time by the target 10, using the first round-trip communication delay time between the target 10 and the anchor 21 and the second round-trip communication delay time between the probe 31 and the anchor 21.

Fourth Embodiment

A fourth embodiment of the present disclosure will be described with reference to FIG. 14. A controller 100 according to the fourth embodiment detects that the target 10 has fraudulently delayed transmission of a measurement packet.

Figure 14:
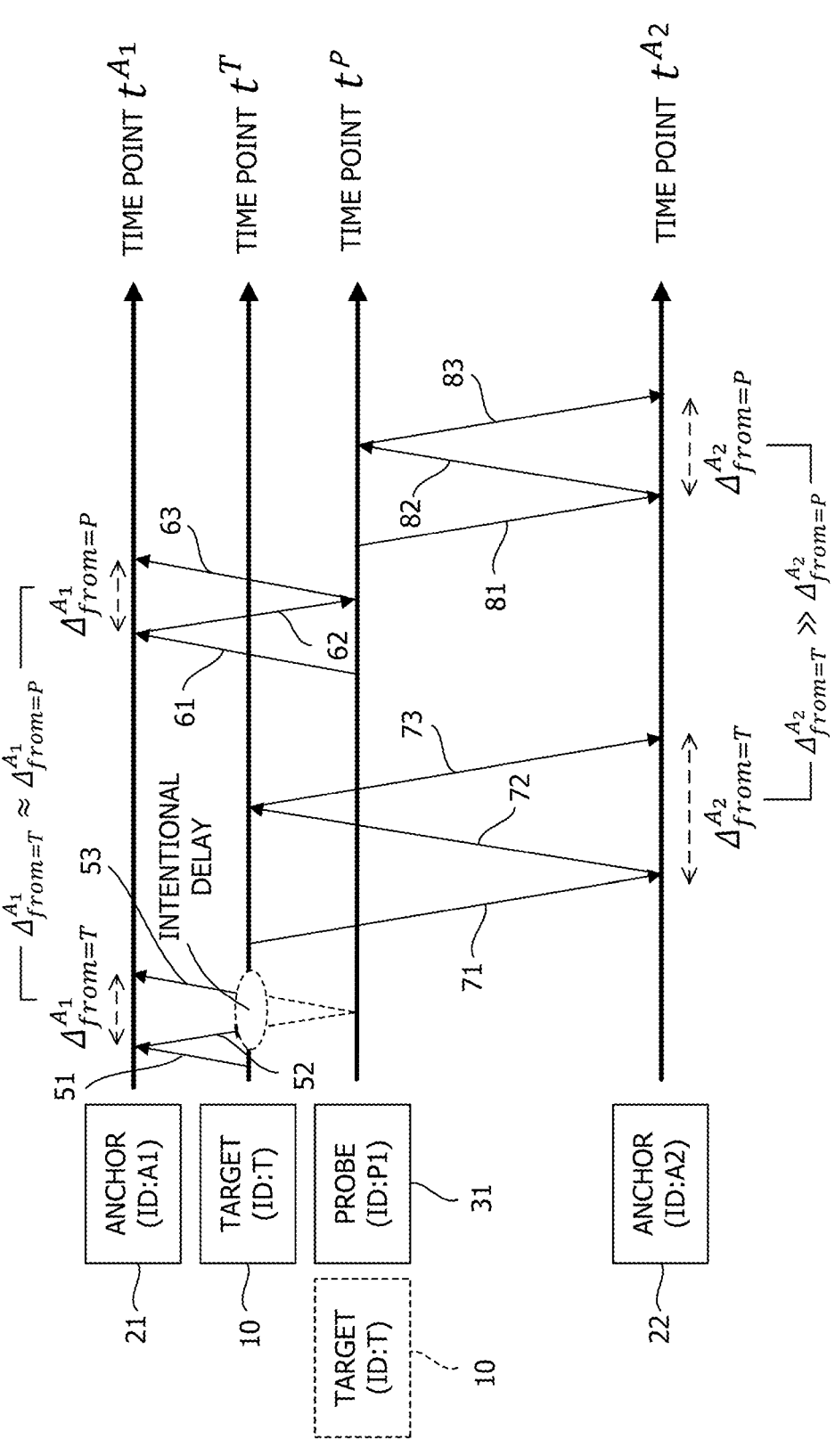
FIG. 14 is a diagram for describing an example of fraud detection using a plurality of anchors.

As illustrated in FIG. 14, the true position of the target 10 is between the position where the anchor 21 is installed and the position where the probe 31 is installed. However, by intentionally delaying a second measurement packet, the position of the target 10 is disguised as the same position as the position where the probe 31 is installed. For example, the target 10 does not immediately transmit the second packet after a response packet 52 responding to a first measurement packet 51 is received from the anchor 21. The target 10 delays transmission of the second packet 53 by time in consideration of a measurement packet transmitted from the probe 31.

On the other hand, when transmission of a packet is requested by the controller 100, the probe 31 transmits a first measurement packet 61 to the anchor 21, and the anchor 21 receives the first measurement packet 61. The anchor 21 transmits a response packet 62 responding to the first measurement packet 61. When the response packet 62 is received, the probe 31 immediately transmits a second measurement packet 63. Accordingly, the anchor 21 receives the second measurement packet 63.

In such a case, the first round-trip communication delay time between the target 10 and the anchor 21 and the second round-trip communication delay time between the probe 31 and the anchor 21 are very close to each other due to fraud by the target 10. As described above, in the case where the target 10 delays transmission of a second measurement packet, there is a possibility that fraud may not be detected only by using the anchor 21 alone. For this reason, the controller 100 according to the fourth embodiment uses another anchor 22 different from the anchor 21 installed at a position in a direction different from that of the anchor 21. A first distance between the anchor 21 and the target 10 is different from a second distance between the anchor 22 and the target 10. For example, the second distance is a longer distance than the first distance.

As a result, when transmission of a packet is requested by the controller 100, the target 10 transmits a first measurement packet 71 to the anchor 22, and the anchor 22 receives the first measurement packet 71. The measurement packet 71 is an example of a fifth packet. The anchor 22 transmits a response packet 72 responding to the first measurement packet 71. When the response packet 72 is received, the target 10 immediately transmits a second measurement packet 73. The measurement packet 73 is an example of a sixth packet. Accordingly, the anchor 22 receives the second measurement packet 73.

When transmission of a packet is requested by the controller 100, the probe 31 transmits a first measurement packet 81 to the anchor 22, and the anchor 22 receives the first measurement packet 81. The measurement packet 81 is an example of a seventh packet. The anchor 22 transmits a response packet 82 responding to the first measurement packet 81. When the response packet 82 is received, the probe 31 immediately transmits a second measurement packet 83. The measurement packet 83 is an example of an eighth packet. Accordingly, the anchor 22 receives the second measurement packet 83.

As a result, the first round-trip communication delay time between the target 10 and the anchor 22 and the second round-trip communication delay time between the probe 31 and the anchor 22 are significantly different from each other. When such large difference between the first round-trip communication delay time and the second round-trip communication delay time is detected, the controller 100 according to the fourth embodiment may detect fraud by the target 10. As described above, even in the case where the target 10 delays transmission of a second measurement packet to the anchor 21, the controller 100 according to the fourth embodiment may detect fraud by using both of the anchors 21 and 22.

Fifth Embodiment

Figure 15:
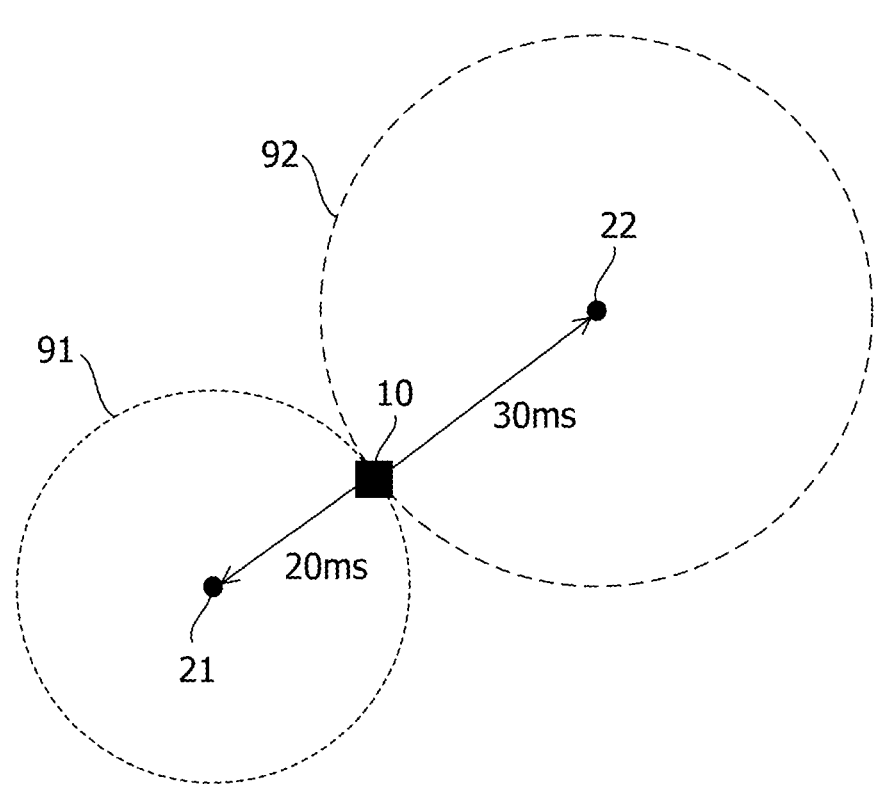
FIG. 15 is a diagram for describing an example of a false declaration using a plurality of anchors.

A fifth embodiment of the present disclosure will be described with reference to FIG. 15. A controller 100 according to the fifth embodiment specifies round-trip communication delay time for the plurality of anchors 21 and 22, and narrows down the position of the target 10. Accordingly, the controller 100 determines the appropriateness of a declaration position of the target 10.

For example, in a case where the anchor 21 measures the first round-trip communication delay time between the target 10 and the anchor 21 as 20 ms, it is assumed that the target 10 is located on a circumference 91 of a radius corresponding to 20 ms around the position of the anchor 21. For example, it may be assumed that the target 10 is located on a radius corresponding to 19 ms to 21 ms including an error.

In a case where the anchor 22 measures the second round-trip communication delay time between the target 10 and the anchor 22 as 30 ms, it is assumed that the target 10 is located on a circumference 92 of a radius corresponding to 30 ms around the position of the anchor 22. For example, it may be assumed that the target 10 is located on a radius corresponding to 29 ms to 31 ms including an error.

When a declaration position greatly deviating from the two circumferences 91 and 92 is declared by the target 10, the verification unit 123 of the controller 100 determines that the declaration position is highly likely to be false. Accordingly, the controller 100 may detect fraud by the target 10.

Although preferred embodiments of the present disclosure have been described above in detail, the present disclosure is not limited to the specific embodiments according to the present disclosure, and various modifications and changes may be made within a scope of the gist of the present disclosure described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A time measurement apparatus comprising:
a memory and
a processor coupled to the memory and configured to:
select, from among a plurality of anchors for each of which an own installation position is registered, a predetermined anchor for which an installation position that geographically corresponds to a declaration position declared by a terminal is registered; and
specify, as round-trip communication delay time between the terminal and the predetermined anchor, time measured based on a reception time point of a first packet received by the predetermined anchor from the terminal and a reception time point of a second packet based on a response packet that responds to the first packet and is received by the predetermined anchor from the terminal.

2. The time measurement apparatus according to claim 1, wherein
the processor specifies, as the round-trip communication delay time, difference time measured based on the reception time point of the first packet and the reception time point of the second packet.

3. The time measurement apparatus according to claim 1, wherein
that the processor verifies appropriateness of the declaration position based on a collation result of password information attached to the response packet and password information attached to the second packet and the round-trip communication delay time.

4. The time measurement apparatus according to claim 3, wherein
the processor determines that the declaration position is appropriate when the collation result indicates an agreement of password information attached to the response packet and password information attached to the second packet.

5. The time measurement apparatus according to claim 3, wherein
the processor determines that the declaration position is fraudulent when the collation result indicates a disagreement of password information attached to the response packet and password information attached to the second packet.

6. The time measurement apparatus according to claim 3, wherein
the processor selects, from among a plurality of probes for each of which an own installation position is registered, a predetermined probe for which an installation position that geographically corresponds to the declaration position is registered,
specifies first difference time of the reception time point of the first packet received by the predetermined anchor from the terminal and the reception time point of the second packet based on the response packet that responds to the first packet and is received by the predetermined anchor from the terminal, and second difference time of a reception time point of a third packet received by the predetermined anchor from the predetermined probe and a reception time point of a fourth packet based on a response packet that responds to the third packet and is received by the predetermined anchor from the predetermined probe, and
verifies the appropriateness of the declaration position based on the first difference time and the second difference time.

7. The time measurement apparatus according to claim 3, wherein
the processor selects, from among a plurality of probes for each of which an own installation position is registered, a predetermined probe for which an installation position that geographically corresponds to the declaration position is registered, and selects another anchor that is installed at a position of different direction from the predetermined anchor and of a longer distance than a distance between the predetermined anchor and the terminal,
specifies third difference time of a reception time point of a fifth packet received by the another anchor from the terminal and a reception time point of a sixth packet based on a response packet that responds to the fifth packet and is received by the another anchor from the terminal, and fourth difference time of a reception time point of a seventh packet received by the another anchor from the predetermined probe and a reception time point of an eighth packet based on a response packet that responds to the seventh packet and is received by the another anchor from the predetermined probe, and verifies the appropriateness of the declaration position based on the third difference time and the fourth difference time.

8. A non-transitory computer-readable recording medium storing a time measurement program causing a computer to execute a process of comprising:

selecting, from among a plurality of anchors for each of which an own installation position is registered, a predetermined anchor for which an installation position that geographically corresponds to a declaration position declared by a terminal is registered; and specifying, as round-trip communication delay time between the terminal and the predetermined anchor, time measured based on a reception time point of a first packet received by the predetermined anchor from the terminal and a reception time point of a second packet based on a response packet that responds to the first packet and is received by the predetermined anchor from the terminal.

9. A time measurement system comprising:

a terminal;

a plurality of anchors for each of which an own installation position is registered; and a processor configured to:

select, from among the plurality of anchors, a predetermined anchor for which an installation position that geographically corresponds to a declaration position declared by the terminal is registered; and specify, as round-trip communication delay time between the terminal and the predetermined anchor, time measured based on a reception time point of a first packet received by the predetermined anchor from the terminal and a reception time point of a second packet based on a response packet that responds to the first packet and is received by the predetermined anchor from the terminal.

* * * * *